United States Patent
Meyer et al.

(10) Patent No.: US 12,468,507 B1
(45) Date of Patent: Nov. 11, 2025

(54) REDUCING POWER CONSUMPTION IN INTEGRATED CIRCUITS

(71) Applicant: Amazon Technologies, Inc., Seattle, WA (US)

(72) Inventors: Paul Gilbert Meyer, Jericho, VT (US); Sundeep Amirineni, Cedar Park, TX (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 989 days.

(21) Appl. No.: 17/449,357

(22) Filed: Sep. 29, 2021

(51) Int. Cl.
*G06F 7/544* (2006.01)
*G06F 7/487* (2006.01)
*G06F 7/76* (2006.01)
*G06F 17/16* (2006.01)
*G06N 3/063* (2023.01)

(52) U.S. Cl.
CPC ............ *G06F 7/5443* (2013.01); *G06F 7/487* (2013.01); *G06F 7/764* (2013.01); *G06F 17/16* (2013.01); *G06N 3/063* (2013.01)

(58) Field of Classification Search
CPC ........ G06F 7/764; G06F 7/487; G06F 7/4876; G06F 7/5443; G06F 17/153; G06F 17/16; G06N 3/04; G06N 3/045; G06N 3/0464; G06N 3/063
See application file for complete search history.

(56) References Cited

U.S. PATENT DOCUMENTS

| | | | |
|---|---|---|---|
| 2015/0227346 A1* | 8/2015 | Burgess | G06F 7/764 708/211 |
| 2016/0358069 A1* | 12/2016 | Brothers | G06F 7/764 |
| 2022/0230066 A1* | 7/2022 | Das | G06N 3/045 |

\* cited by examiner

*Primary Examiner* — Emily E Larocque
(74) *Attorney, Agent, or Firm* — Weaver Austin Villeneuve & Sampson LLP

(57) ABSTRACT

Techniques for replacing input values being loaded into a computational circuit are described. Small input values such as denormal numbers can be replaced with alternative values such as zeros to reduce switching activity in the computational circuit, and thus reduce power consumption. In applications such as most neural networks, the impact on the prediction results when replacing small numbers with zeros can be negligible. In applications where high precision computations may be desirable, the input values can be loaded into the computation circuit without modification.

24 Claims, 9 Drawing Sheets

REDUCING POWER CONSUMPTION IN INTEGRATED CIRCUITS

BACKGROUND

Neural networks can be trained using machine learning techniques to perform a certain computing task for an application. The trained neural network can then perform the computing task, for example, to generate an inference from input data. Computing tasks that neural networks can perform may include human-like functions such as visual and audial perception, natural language processing, etc. To speed up training and inference, neural network accelerators with computational circuits tailored for neural network computation can be used.

BRIEF DESCRIPTION OF THE DRAWINGS

Various embodiments in accordance with the present disclosure will be described with reference to the drawings, in which.

DETAILED DESCRIPTION

Neural network accelerators are becoming increasingly power dominant due to the complex workloads and computations utilized in neural networks. In some systems, execution on the neural network accelerators may need to be throttled to meet the system's thermal design point to avoid overheating the system and causing damage to the system's components. For example, instead of constantly running an accelerator at full capacity, the accelerator or certain portions thereof can be intermittently turned off to reduce power consumption and to keep the generated heat within the heat dissipation capabilities of the system. However, throttling the neural network accelerator as such reduces performance and may increase the compute latency of the system.

The techniques disclosed herein provide a hardware mechanism to reduce power consumption of compute engines by flushing values to alternative values such as zeros to reduce switching activity when performing arithmetic computations. A majority of the power consumption in neural network accelerators are spent in the arithmetic circuits. Most neural network workloads tend to perform a large amount of small-number computations such as computations involving small weight values and activation functions with a wide small value range. Meanwhile, most neural network models can tolerate some level of imprecision and still provide suitable results. As such, by flushing small values to zeros in the neural network accelerator, the power consumption can be reduced while still achieving suitable results. The hardware power savings mechanism uses a filter circuit with a configurable bit mask to mask out certain values such as denormal numbers. The filter circuit can be implemented with minimal logic gates to limit the impact on chip area. The configurable nature of the bit mask also allows the filter function to be bypassed to perform high precision computations when the workload demands such precision.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
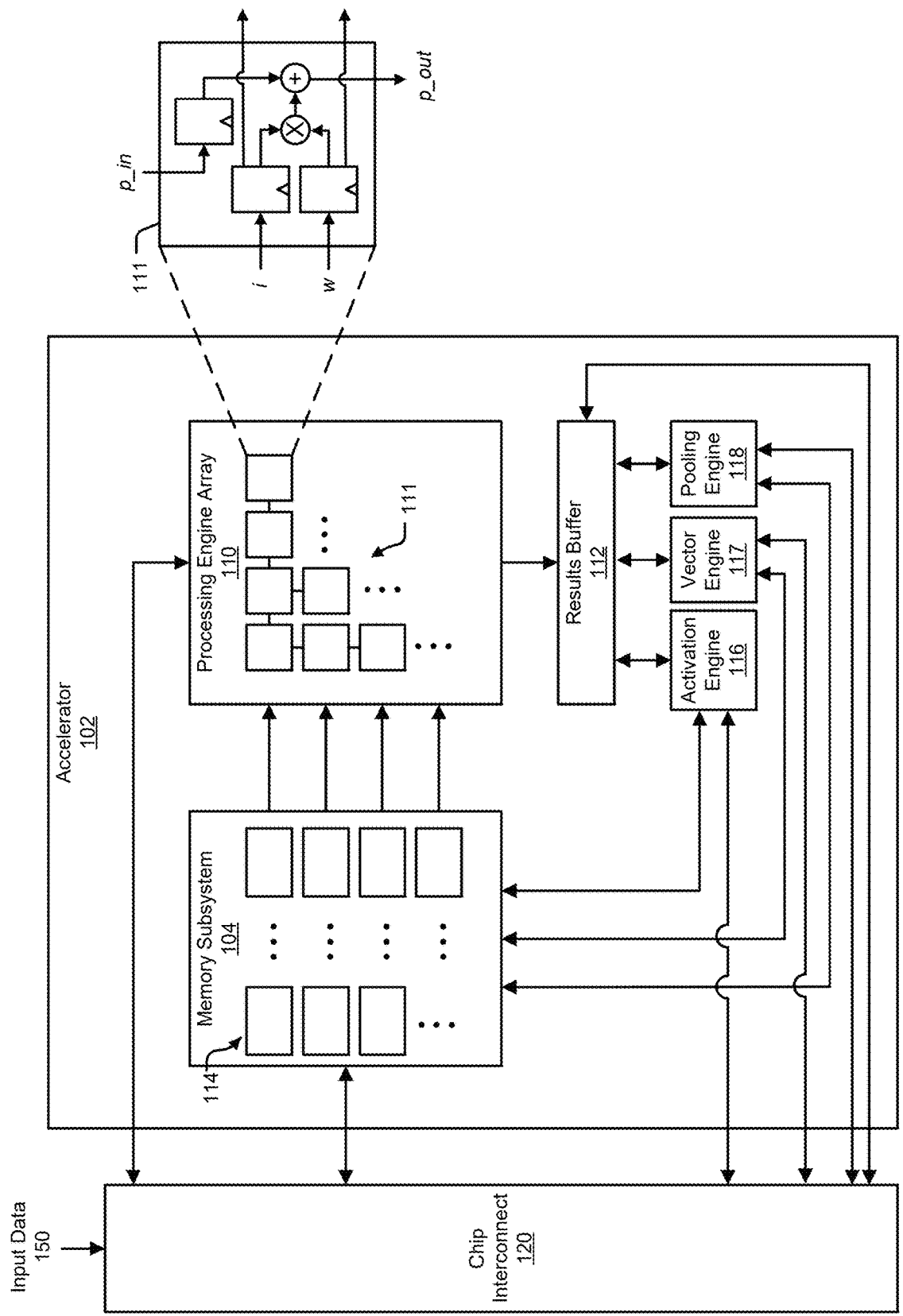
FIG. 1 illustrates a block diagram of an example of an integrated circuit device.

FIG. 1 is a block diagram illustrating an example of an integrated circuit device that can include an accelerator 102. In various examples, the accelerator 102, for a set of input data (e.g., input data 150), can execute computations using various compute engines such as a processing engine array 110, an activation engine 116, a vector engine 117, and/or a pooling engine 118. In some examples, accelerator 102 can be an integrated circuit component of a processor, such as a neural network processor. The processor may have other integrated circuit components, including additional accelerator engines.

In various implementations, the memory subsystem 104 (may also be referred to as a state buffer) can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the vector engine 117, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116, the vector engine 117, and the pooling engine 118 can include multiple execution (may also be referred to as computational channels), each of which can be separate memory clients. The memory banks 114 can be implemented, for example, using static random access memory (SRAM).

In various implementations, the memory subsystem 104 can include control logic. The control logic can, for example, keep track of the address spaces of each of the memory banks 114, identify memory banks 114 to read from or write to, and/or move data between the memory banks 114. In some implementations, memory banks 114 can be hardwired to particular clients. For example, a set of memory banks 114 can be hardwired to provide values to the rows of the processing engine array 110, with one memory bank servicing each row. As another example, a set of memory banks can be hard wired to receive values from columns of the processing engine array 110, with one memory bank receiving data for each column.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111 (may also be referred to as processing elements) arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 428 rows, or some other number of columns and rows.

An example of a processing engine 111 is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above can include a partial sum, p_in, provided either from another processing engine 111 or from a previous round of computation by the processing engine array 110. When starting a computation for a new set of input data, the top row of the processing engine array 110 can receive a fixed value for p_in, such as zero. As illustrated by this example, i and w are multiplied together and the result is summed with p_in to produce a new partial sum, p_out, which can be input into another processing engine 111. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118. Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

In some implementations, the accelerator 102 can further include a vector engine 117. Vector engine 117 is a compute engine that can perform computations and manipulations on values stored in memory subsystem 104 and/or results buffer 112 such as values representing matrices of input values, weight values, intermediate results, etc. Vector engine 117 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 117 can operate in parallel and/or simultaneously. In some examples, the vector engine 117 can be bypassed or be omitted.

Herein, the activation engine 116, the vector engine 117, and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116, the vector engine 117, and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Figure 2:
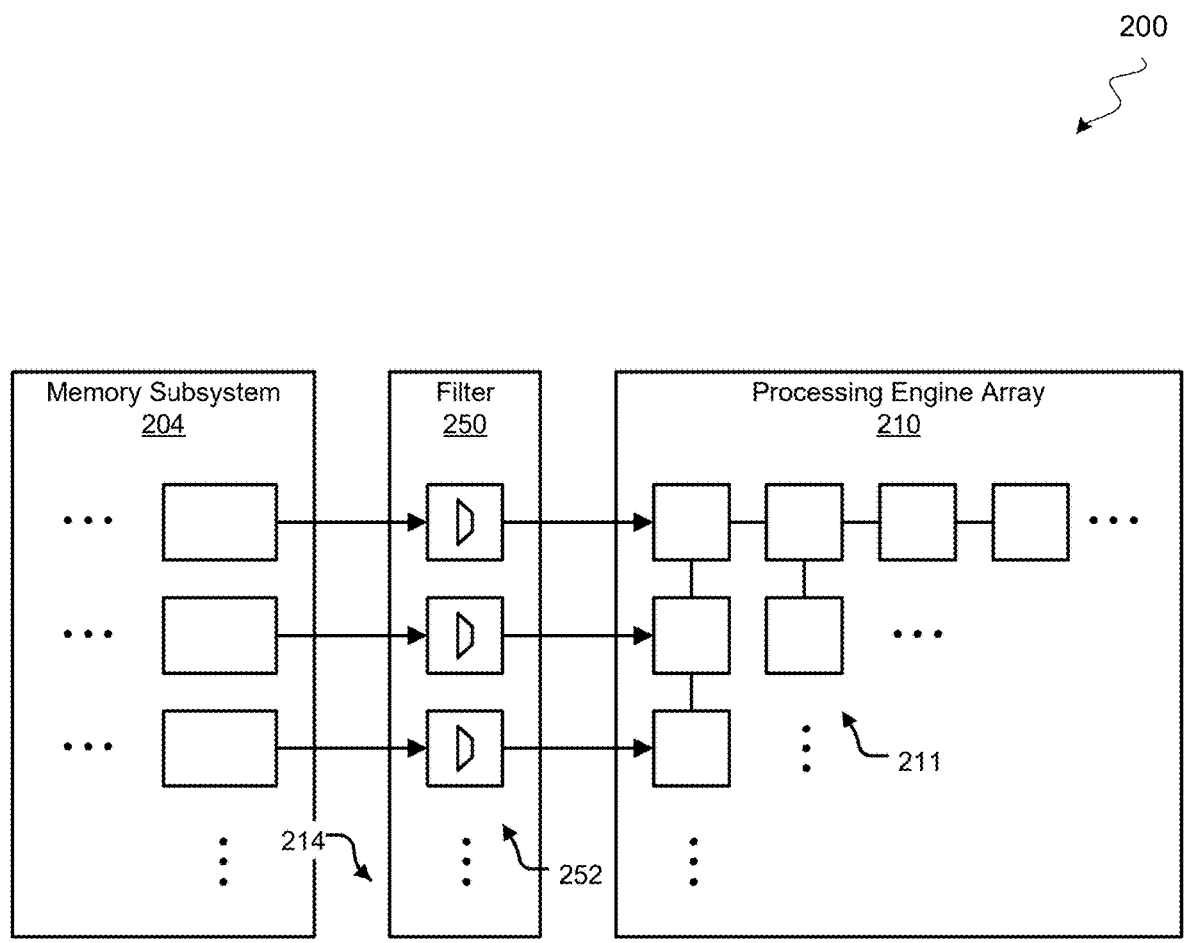
FIG. 2 illustrates a block diagram of an example of an integrated circuit device having a filter circuit.

FIG. 2 illustrates a block diagram of an example of an integrated circuit device 200. Integrated circuit device 200 can be, for example, part of a neural network processor implemented using accelerator 102. Hence, integrated circuit device 200 may include other components of accelerator 102 not specifically shown in FIG. 2.

Integrated circuit device 200 includes an array of processing elements 210 (e.g., processing engine array 110), which includes processing elements 211 arranged in rows and columns. The array of processing elements 210 may also be referred to as a PE array. Each processing element 211 (e.g., processing engine 111) of the PE array 210 is operable to multiply a feature map input element with a weight value to generate a multiplication result, add the multiplication result to a column input to generate a partial sum, and output the partial sum to a column output. Integrated circuit device 200 also includes a memory 204 (e.g., memory subsystem 104 implementing a state buffer) that is operable to store input values for loading into the PE array 210.

To reduce the power consumption of the PE array 210, a filter 250 can be used to flush certain values being inputted into the PE array 210 to alternative values such as zeros. For example, in some implementations, filter 250 can be configured to flush small numbers such as denormal numbers (e.g. floating-point numbers with all zero exponent bits) to zeros. Hence, instead of performing calculations on small numbers that may lack any meaningful impact on the neural network predictions, the power consumption of the PE array 210 can be reduced by zeroing out the input values to reduce switching activity of the processing elements 211.

Filter 250 may include a set of filter circuits 252 that are each operable to replace input values being loaded into PE array 210 with alternative values such as zeros. Each filter circuit 252 can be coupled between memory 204 and a row of the PE array 210, and each filter circuit 252 may have an associated configurable threshold value. In some implementations, the configurable threshold value can be represented using a bit mask. When an input value is read from memory 204 for loading into the array, the input value can be compared with the configured threshold value. If the input value is below the threshold value, an alternative value such as zero (or other configurable constant value) is loaded into the row of the PE array 210 instead of the input value. If the input value is at or greater than the threshold value, the input value can be loaded into the row of the PE array 210.

In some implementations, integrated circuit device 200 may include a configuration register to store a value representing the threshold value, and the setting stored in the configuration register can be applied to every filter circuit 252 of PE array 210. In some implementations, the rows of PE array 210 can be divided into row groups (e.g., groups of 64 rows, groups of 32 rows, groups of 16 rows, groups of 8 rows, groups of 4 rows, etc.), and each row group may have a configurable threshold value that can be configured independently from the other row groups. For example, integrated circuit device 200 may include a configuration register for each row group, or other storage elements to independently store a value for each row group to represent the threshold value for that row group. Hence, the set of filter circuits in filter 250 may include a first filter circuit having a first configurable threshold value configured to a first value, and a second filter circuit having a second configurable threshold value configured to a second value. The two filter circuits may correspond to different row groups. In some implementations, the threshold value can be independently configured for each row.

Filter 250 may also be configurable to flush feature map input values only, flush weight values only, or flush both feature map input and weight values. For example, if separate row input buses are used for loading feature map input values separately from the weight values, separate filter circuits 252 can be used for the row input buses to allow the filter circuit for the feature map input values and the filter circuit for the weight values to be independently configured and/or be independently enabled/disabled. In implementations in which a multiplexed row input bus is used (e.g., feature map inputs and weights are loaded into PE array 210 using the same row input bus), a datatype tag may accompany the input value to identify whether the input value is a feature map or a weight value. In such implementations, the filter circuit configuration may include a configuration tag to indicate whether feature map values, weight values, or both are to be flushed. The filter circuit 252 can compare the configuration tag to the datatype tag to determine whether the input value is to be flushed. In some implementations, the threshold value used for flushing weights and the threshold value used for flushing feature map input values can be independently configured such that different thresholds are applied to weights and feature map inputs.

Figure 3:
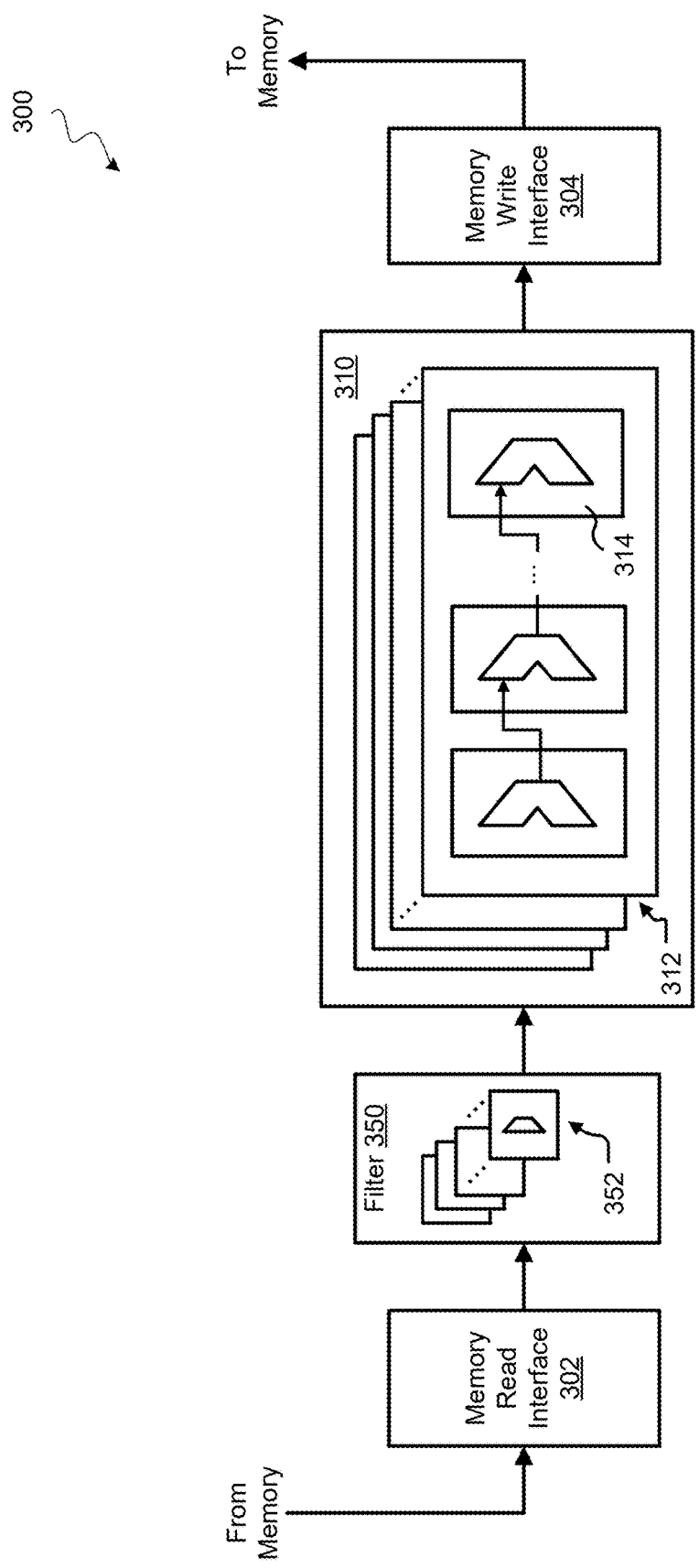
FIG. 3 illustrates a block diagram of another example of an integrated circuit device having a filter circuit.

FIG. 3 illustrates a block diagram of another example of an integrated circuit device 300. Integrated circuit device 300 can be, for example, part of a data processor (e.g., a processor, a graphics processor, a digital signal processor, a tensor processor, a neural network accelerator, or other types of application specific integrated circuits that process data). In some implementations, integrated circuit device 300 can be part of accelerator 104. For example, integrated circuit device 300 can be an execution engine that is used to implement any of activation engine 116, vector compute engine 117, or pooling engine 118 of accelerator 104.

Integrated circuit device 300 includes a compute engine 310 that may interface with one or more memories via memory read interface 302 and memory write interface 304. Compute engine 310 may read from one memory and write to another, and/or read and write to the same memory. For example, in implementations in which integrated circuit device 300 is an execution engine implementing any of activation engine 116, vector compute engine 117, or pooling engine 118 of accelerator 104, compute engine 350 may interface with a state buffer memory (e.g., memory subsystem 104) and a results buffer memory (e.g., results buffer 112). Compute engine 310 may obtain data to process from either or both of these buffer memories via memory read interface 302, and may write the output to either or both of these buffer memories via memory write interface 304. By way of example, compute engine may read input data from a results buffer memory, perform computations on the input data, and write the output data to a state buffer memory. As another example, compute engine may read input data from a state buffer memory, perform computations on the input data, and write the output data back to the state buffer memory.

Compute engine 350 can include one or more computational channels 312 to perform parallel data processing. For example, compute engine 350 may include four, eight, sixteen, or other number of computational channels 312. Each of the computational channels 312 can be implemented using multiple computation circuits 314 coupled in series to form multiple compute stages. For example, a computational channel 312 may include three, four, eight, sixteen, or other number of computation circuits 314 coupled in series. The first computation circuit of the computation circuits 314 coupled in series to form a computational channel 312 may have one input or one operand that corresponds to an input value read from memory read interface 302, and the other inputs or operands to the computation circuit can be programmed to receive a value from various sources such as a constant value, a value stored at a memory location, a feedback value from another stage of the channel, etc. The output of the first computation circuit is then provided as an input to the next computation circuit, and so on. The output of the last computation circuit in a channel is then provided to memory write interface 304 to be written to a location in the destination memory.

In some implementations, a computation circuit 314 can be implemented using a programmable arithmetic logic unit (ALU) circuit as shown. For instance, a vector compute engine or a pooling engine may have their computation circuits 314 implemented using ALU circuits. Each programmable ALU circuit can be programmed to perform various functions such as inversion, bit shift, addition, subtraction, multiplication, division, maximum, minimum, passthrough, bitwise or logical logic functions (e.g., AND, OR, XOR), etc. Multiple of such computation circuits can be coupled in series to implement a computational pipeline. By forming a pipeline of ALU circuits, complex operations (e.g., sorting) and complex computations (e.g., square root) can be implemented.

In some implementations, a computation circuit 314 can be implemented using a programmable multiply-and-accumulate circuit, and multiple of such computation circuits can be coupled in series to form a polynomial calculation circuit. For instance, an activation engine may have its computation circuits 314 implemented using multiply-and-accumulate circuits to perform piecewise polynomial approximations. In such implementations, the polynomial degree may determine the number of stages of computation circuits coupled in series. For example, to implement a polynomial to the third degree, three multiply-and-accumulate circuits can be coupled in series. As another example, to implement a polynomial to the fourth degree, four multiply-and-accumulate circuits can be coupled in series.

To reduce the power consumption of the compute engine 310, a filter 350 can be used to flush certain values being inputted into the compute engine 310 to alternative values such as zeros. For example, in some implementations, filter 350 can be configured to flush small numbers such as denormal numbers (e.g. floating-point numbers with all zero exponent bits) to zeros. Hence, instead of performing calculations on small numbers that may lack any meaningful impact on the output results, the power consumption of the compute engine 310 can be reduced by zeroing out the input values to reduce switching activity of the computation circuits 314.

Filter 350 may include a set of filter circuits 352 that are each operable to replace input values being loaded into compute engine 310 with alternative values such as zeros. Each filter circuit 352 can be coupled between a memory and a computational channel 312 of compute engine 310. Each filter circuit 352 may have an associated configurable threshold value. In some implementations, the configurable threshold value can be represented using a bit mask. When an input value is read from memory via memory read interface 302 for loading into the computational channel 312, the input value can be compared with the configured threshold value. If the input value is below the threshold value, an alternative value such as zero (or other configurable constant value) is loaded into the computational channel 312 instead of the input value. If the input value is at or greater than the threshold value, the input value can be loaded into the computational channel 312.

In some implementations, integrated circuit device 300 may include a configuration register to store a value representing the threshold value, and the setting stored in the configuration register can be applied to the filter circuit 352 of every computational channel. In some implementations, each computational channel 312 may have a configurable threshold value that can be configured independently from the other computational channel. For example, integrated circuit device 300 may include a configuration register for each computational channel, or other storage elements to independently store a value for each computational channel to represent the threshold value for that computational channel. Hence, the set of filter circuits in filter 350 may include a first filter circuit having a first configurable threshold value configured to a first value, and a second filter circuit having a second configurable threshold value configured to a second value. The two filter circuits may correspond to different computational channels.

Referring back to accelerator 102 of FIG. 1, each of PE array 110, activation engine 116, vector compute engine 117, and pooling engine 118 may have their own respective filters to flush input values to alternative values such as zeros. In other words, PE array 110 may have a first set of filters circuits (e.g., filter 250) to reduce power consumption of PE array 110, activation engine 116 may have a second set of filter circuits (e.g., filter 350) to reduce power consumption of activation engine 116, vector compute engine 117 may have a third set of filter circuits (e.g., filter 350) to reduce power consumption of vector compute engine 117, and pooling engine 118 may have a fourth set of filter circuits (e.g., filter 350) to reduce power consumption of pooling engine 118. Each of these four sets of filter circuits can be independently enabled/disabled, and each of these four sets of filter circuits can be independently configured with their own respective configurable threshold values. In some implementations, a single configuration register can be used to apply the same configurable threshold value to all four sets of filter circuits. It should also be understood that one or more of the computational blocks may omit the filter block. For example, accelerator 102 may include a filter for each of the PE array 110 and activation engine 118, but no filter for vector compute engine 117 and pooling engine 118.

Figure 4:
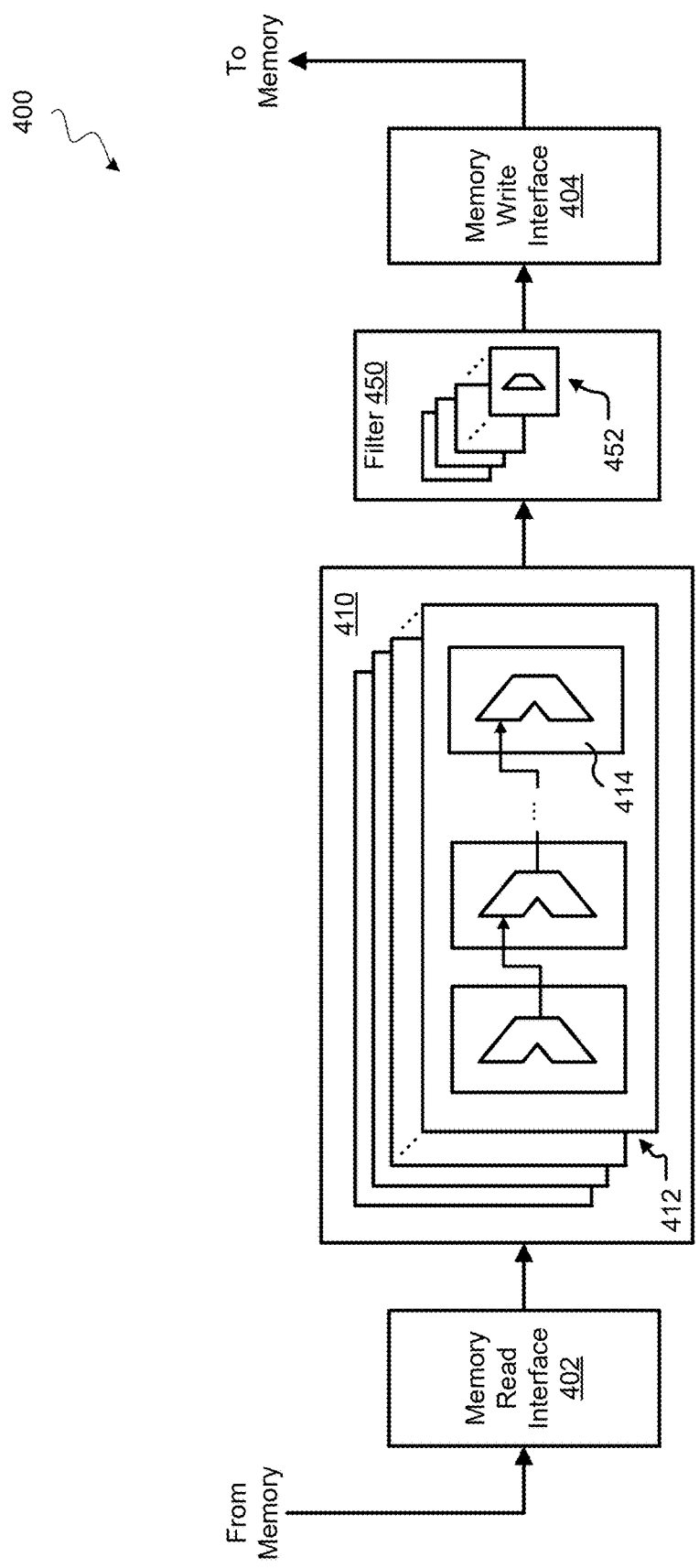
FIG. 4 illustrates a block diagram of a further example of an integrated circuit device having a filter circuit.

FIG. 4 illustrates a block diagram of another example of an integrated circuit device 400. The components of integrated circuit device 400 are similar to those of FIG. 3, and thus a detailed description of which need not be repeated. Integrated circuit device 400 differs from integrated circuit device 300 in that filter 450 is coupled between the output of compute engine 310 and the destination memory. Thus, filter 450 can be used to flush output values from compute engine 310 to alternative values such as zeros (or other configurable constant values). When such an implementation is used, for example, in activation engine 118 of accelerator 104, filter 450 can reduce the power consumption of PE array 110. This is because the output of activation engine 118 is typically written into the state buffer for loading into PE array 110. Hence, flushing the output values of activation engine 118 to alternative values such as zeros has a similar effect as flushing the input values into PE array 110, because the values read from state buffer for inputting into PE array 110 would have already been replaced with the alternative values such as zeros. A similar technique can be implemented in the vector compute engine 117 and pooling engine 118 to reduce power consumption of PE array 110. In some implementations, compute engine 410 may include both an input filter (e.g., filter 350) as well as an output filter 450, and the input and output filters can be independently configurable and be independently enabled/disabled, or a common configuration can be applied to both filters.

Figure 5A:
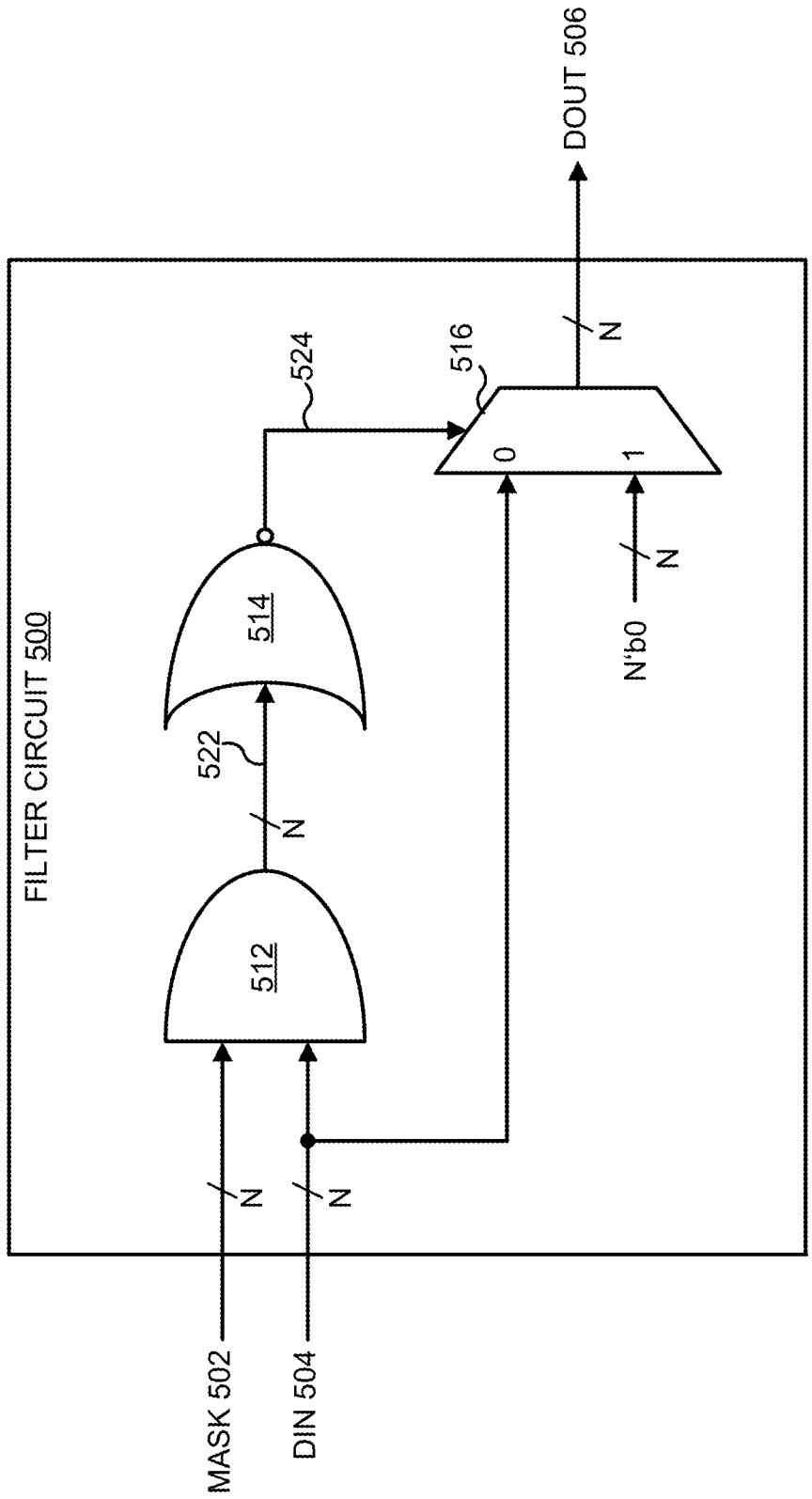
FIG. 5A illustrates a block diagram of an example of a filter circuit.

FIG. 5A illustrates a block diagram of an example of a filter circuit 500. Filter circuit 500 can be used to implement, for example, any of filter circuits 252, 352, or 452. Filter circuit 500 may include two inputs-a data input (DIN) 504 operable to receive an input value, and a mask input (MASK) 502 operable to receive a configurable bit mask representing a threshold value. DIN 504 is a N-bit input (e.g., an 8-bit input, a 16-bit input, a 32-bit input, a 64-bit input, or other multibit input). The input value received on DIN 504 can be, for example, an integer or a floating-point number (e.g., FP16, BP16, FP32, etc.). MASK 502 may include the same number of data bits as DIN 504 to form a bit mask for DIN 504.

Filter circuit 500 may include a selection circuit 516, and logic circuitry such as AND logic gate 512 and NOR logic gate 512. The AND logic gate 512 is operable to perform a bitwise AND operation on MASK 503 and DIN 504 to generate a masked value 522. Hence, if DIN 504 and MASK 502 each has 16 bits, masked value 522 will also have 16 bits. The NOR logic gate 514 is operable to perform a NOR operation on the data bits of the masked value 522 to generate a select signal 524 to control a selection circuit 516. For example, if masked value 522 has 16 bits, NOR logic gate 514 will collapse the 16 bits of masked value 522 by performing a NOR operation on each bit to generate a single bit selection signal 524. Selection circuit 516 can be, for example, a multiplexer, and is operable to select between DIN 504 and a zero value represented using the same number of bits as DIN 504 to generate a data output (DOUT) 506.

In some implementations, filter circuit 500 can be configured to flush denormal numbers to zeros. For instance, MASK 503 can be configured to have a logic one value on every exponent bit of a floating-point number format of the data input. By way of example, for a FP16 data format, MASK 503 can be configured as {1'b0, 5'b11111, 10'b0} such that all the exponent bits are set to '1'. The effect of such a configuration is that input data values received on DIN 504 having all zeros on the exponent bits (e.g., a denormal number) will generate a mask value 522 of all zeros. Selection signal 524 will be asserted because performing a NOR operation on all zeros yields a logic one, and all zeros will be outputted from filter circuit 500 on DOUT 506. Input data values having a '1' on any exponent bit will cause selection signal 524 to be deasserted, and the input value received on DIN 504 will be outputted on DOUT 506.

By flushing small numbers such as denormal numbers to zeros in this manner, the power consumption of the computational circuit that is operable to perform a computation on the output DOUT 506 of filter circuit 500 can be lowered by reducing the switching activity of the computational circuit. For example, the computational circuit operating on DOUT 506 can be a set of arithmetic logic units coupled in series (e.g., computational channel of compute engine 310, 410), or a set of multiply-and-accumulate circuits (e.g., row of PE array 110, 210, or computational channel of compute engine 310, 410). In some implementations, filter circuit 500 can be disabled by setting all zeros on MASK 502. This configuration of the bit mask allows all input values received on DIN to be outputted on DOUT. Filter circuit 500 can be disabled, for example, when operating in a high-precision compute mode of operation in which small numbers are taken into account for computations. Filter circuit 500 can be enabled, for example, when operating in a power-savings mode of operation by setting an appropriate value on MASK 502.

In some implementations, the range of values being flushed to zeros can be adjusted by modifying the bit mask on MASK 502. For example, continuing with the FP16 floating-point number format, in addition to having every exponent bit set to a logic one, setting one or more most significant mantissa bits (one or more MSB of the mantissa) in the bit mask (e.g., {1'b0, 7'b1111111, 8'b0}) will configure filter circuit 500 to flush only a subset of denormal numbers to zeros. The number of MSB bits of the mantissa that are set to a logic one can be modified to adjust a denormal threshold number such that input values smaller than the denormal threshold number are replaced with zeros. Similarly, by setting only a set of most signification exponent bits (one or more MSB of the exponent) to a logic one in the bit mask (e.g., {1'b0, 4'b1111111, 11'b0}), a larger set of numbers that includes the denormal numbers and some small normal numbers will be flushed to zeros. In the context of neural networks (e.g., when the computational circuit operating on DOUT 506 is configured to performed neural network computations based on a neural network model), this flexibility allows different values of the bit mask to be configured for different neural network models to flush different ranges of values to zeros, depending on the precision and accuracy demanded by the particular neural network model. In some implementations, different values of the bit mask can be programmed for different layers of the same neural network model.

Figure 5B:
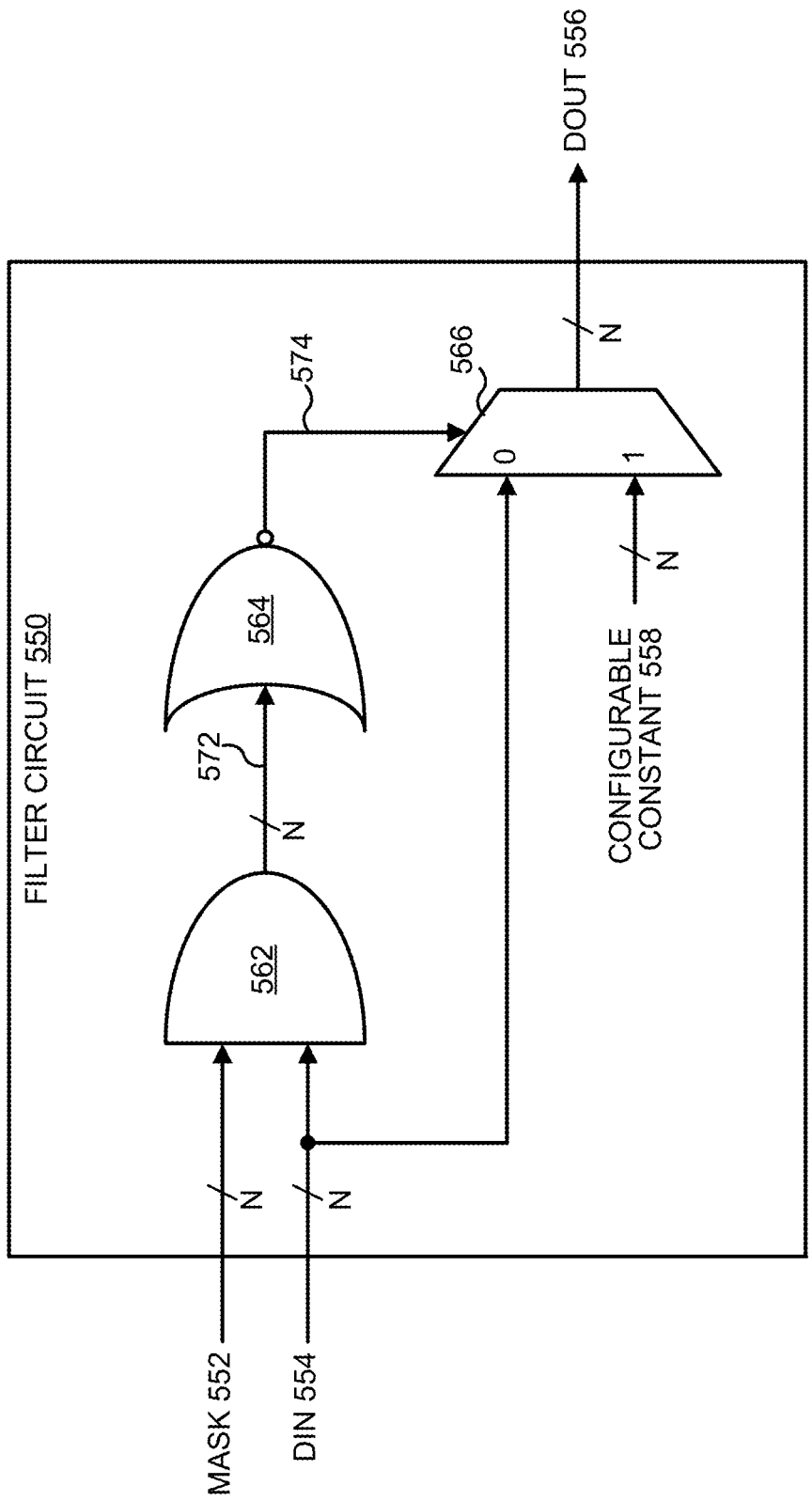
FIG. 5B illustrates a block diagram of another example of a filter circuit.

FIG. 5B illustrates a block diagram of another example of a filter circuit 550. Filter circuit 550 can be used to implement, for example, any of filter circuits 252, 352, or 452. Filter circuit 550 can have a similar structure as filter circuit 500, and may include two inputs-a data input (DIN) 554 and a mask input (MASK) 552.

Filter circuit 550 may also include a selection circuit 566, and logic circuitry such as AND logic gate 562 and NOR logic gate 564. The NOR logic gate 564 is operable to perform a NOR operation on the data bits of the masked value 572 to generate a select signal 574 to control a selection circuit 566. Selection circuit 566 can be, for example, a multiplexer, and is operable to select between DIN 554 and an alternative value such as a configurable constant 558 to generate a data output (DOUT) 556. Hence, in contrast to filter circuit 500, filter circuit 550 can be used to replace an input value received on DIN 554 with programmable value. Configurable constant 558 can be stored, for example, in a register or other memory or storage circuitry. In some implementations, multiple filter circuit can share the same register/storage, and the filter circuits sharing the same register/storage will replace input values with the same programmed constant value stored in the register/storage. In some implementations, different sets of filter circuits can share different registers/storage elements such that different sets of filter circuits can be programmed to replace input values with different constant values. In some implementations, each filter circuit may have its own independent register or storage to store a configurable constant value that is used to replace an input value. Filter circuit 550 can be used to implement filter circuit 500, for example, by programming configurable constant 558 to zero.

Figure 6:
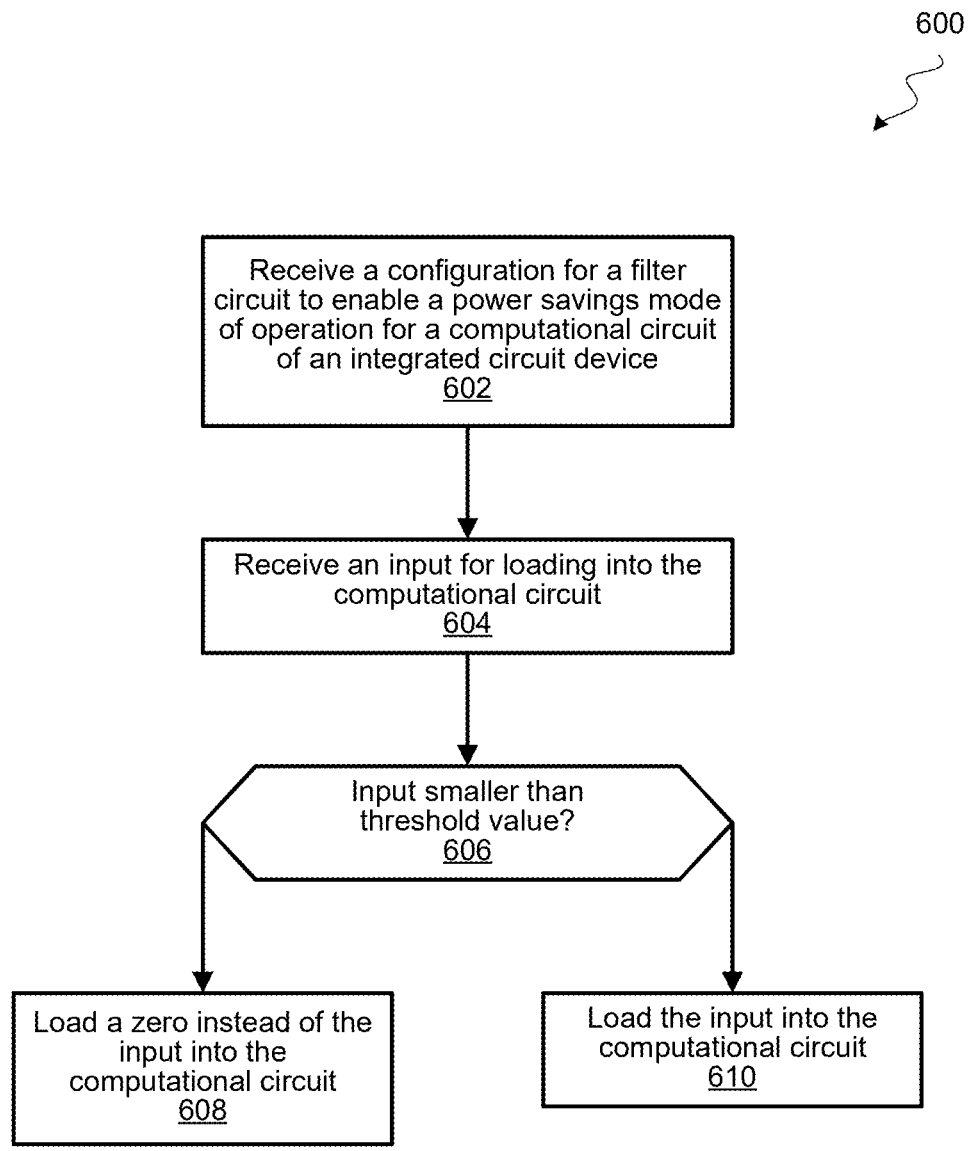
FIG. 6 illustrates a flow diagram of an example of a process for reducing power consumption.

FIG. 6 illustrates a flow diagram of an example of a process 600 for reducing power consumption in a computational circuit. Process 600 can be performed, for example, by an accelerator such as a neural network processor or other types of data processors. The computational circuit can be, for example, an array of processing elements (e.g., PE array 110, 210) or a compute engine (e.g., compute engine 310).

Process 600 may begin at block 602 by receiving a configuration for a filter circuit (e.g., filter circuit 500) to enable a power savings mode of operation for a computational circuit of an integrated circuit device. The power savings mode can be a mode of operation in which high precision calculations are not needed to achieve the desired accuracy. The configuration can be a bit map having a floating-point number format (e.g., FP16, BP16, FP32, etc.). By way of example, the bit map may have a logic one value on every exponent bit of the floating-point number format. Such a setting can be used to configure the filter circuit to flush denormal numbers to alternative values such as zeros.

At block 604, an input value is received for loading into the computational circuit. The input value can be a value read from a memory such as a state buffer, and the input value can be a feature map input value or a weight value. At block 606, a determination is made as to whether the input value is smaller than a threshold value represented by the configuration. For example, if the bit map of the configuration has a logic one value on every exponent bit of the floating-point number format, a determination is made by the filter circuit as to whether the input value is a denormal number (e.g., smaller than a normalized number-a number with a non-zero exponent).

If it is determined that the input value is smaller than the threshold value (e.g., input value is a denormal number), then at block 608, instead of loading the input value, an alternative value such as zero (or other configurable constant value) is loaded into the computational circuit. If it is determined that the input value is not smaller than the threshold value (e.g., input value is a normalized number), then at block 610, the input value is loaded into the computational circuit.

In some implementations, another configuration can be received for the filter circuit to disable the power savings mode. For example, the filter circuit can be disabled with a bit map having all zeros. Upon disable the power-savings mode, when an input value is received for loading into the computational circuit, and the input value can be loaded into the computational circuit regardless of what that value is.

Figure 7:
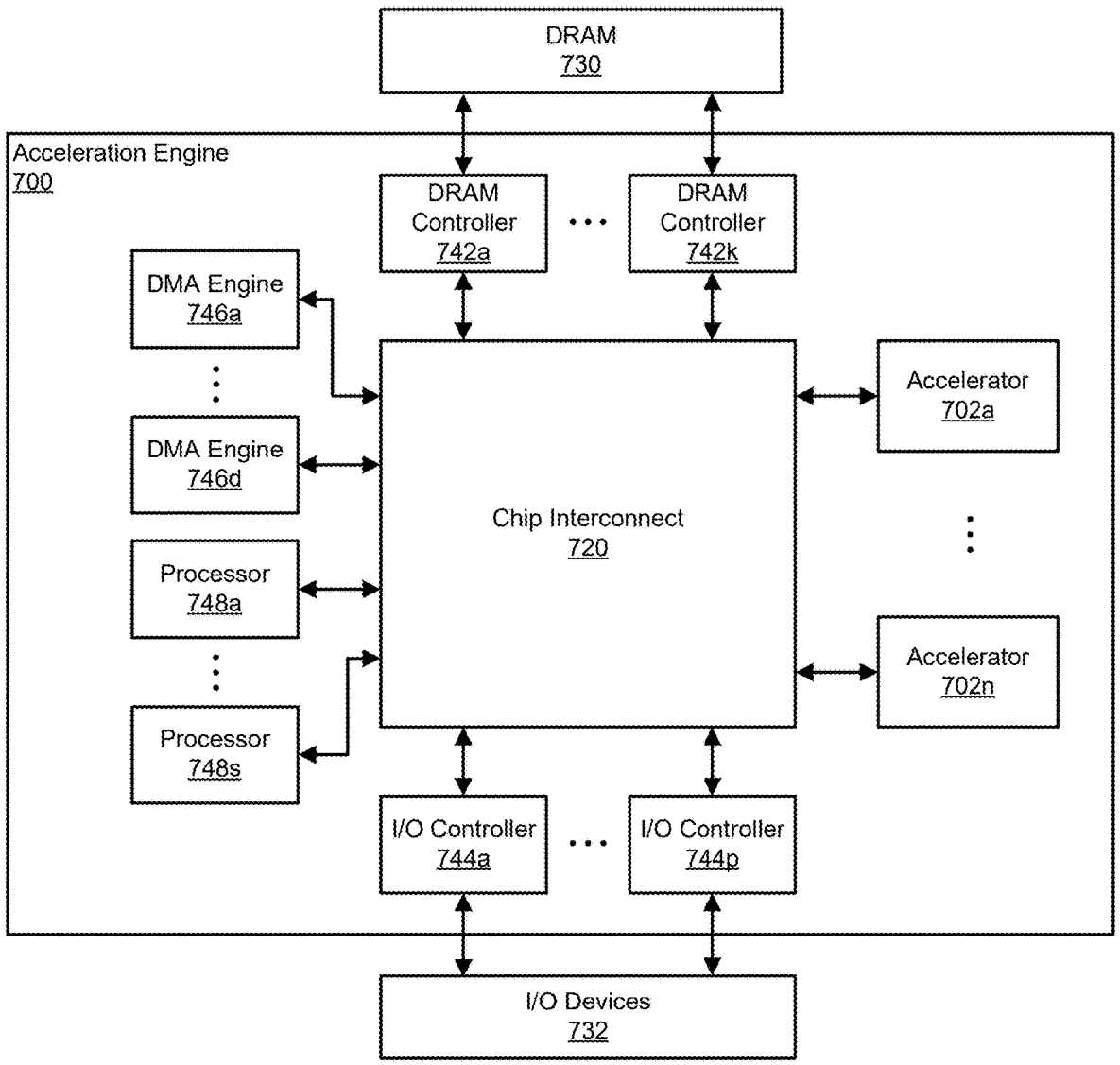
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 1.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the accelerators 702a-702n is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
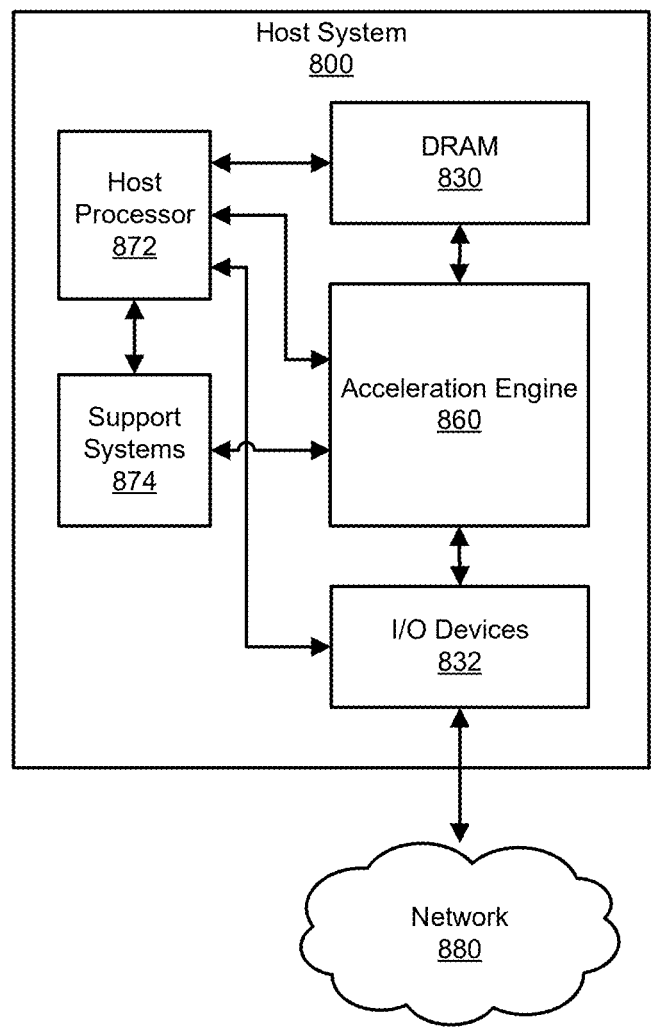
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
    a filter circuit comprising:
        a selection circuit operable to select between an input value and an alternative value; and
        logic circuitry operable to perform a bitwise AND operation on a configurable bit mask and the input value to generate a masked value, and to perform a NOR operation on bits of the masked value to generate a select signal to control the selection circuit; and
    a computational circuit operable to perform a computation on an output of the filter circuit.

2. The integrated circuit device of claim 1, wherein the alternative value is a configurable constant value.

3. The integrated circuit device of claim 1, wherein the alternative value is zero.

4. The integrated circuit device of claim 1, wherein the configurable bit mask is configured to have a logic one value on each bit of a set of most significant exponent bits of a floating-point number format.

5. The integrated circuit device of claim 1, wherein the configurable bit mask is configured to have a logic one value on every exponent bit of a floating-point number format.

6. The integrated circuit device of claim 5, wherein the configurable bit mask is configured to have a logic one value on each bit of a set of one or more most significant mantissa bits of the floating-point number format.

7. The integrated circuit device of claim 1, wherein the computational circuit includes a set of arithmetic logic units coupled in series.

8. The integrated circuit device of claim 1, wherein the computational circuit includes a set of multiply-and-accumulate circuits.

9. The integrated circuit device of claim 1, wherein the filter circuit is enabled during a power-savings mode of operation.

10. The integrated circuit device of claim 1, wherein the filter circuit is disabled during a high-precision compute mode of operation.

11. The integrated circuit device of claim 1, wherein the computational circuit is configured to perform neural network computations based on a neural network model, and the configurable bit mask is configured to different values for different neural network models.

12. The integrated circuit device of claim 1, wherein the computational circuit is configured to perform neural network computations based on a neural network model, and the configurable bit mask is configured to different values for different layers of the neural network model.

13. The integrated circuit device of claim 1, wherein the filter circuit is a first filter circuit and the computational circuit is a first computational circuit, and the integrated circuit device further comprises a second filter circuit coupled to a second computational circuit, and
wherein the configurable bit mask of the first filter circuit is configured with a different value than a configuration bit mask of the second filter circuit.

14. The integrated circuit device of claim 1, wherein the output of the filter circuit is written to a memory, and the output of the filter circuit is provided to the computational circuit from the memory to perform the computation on the output of the filter circuit.

15. The integrated circuit device of claim 14, wherein the input value of the filter circuit is outputted by a compute engine of the integrated circuit device.

16. The integrated circuit device of claim 15, wherein the computational circuit is part of a processing engine array that performs matrix multiplication operations, and wherein the compute engine is an activation engine that computes piecewise polynomial approximations.

17. The integrated circuit device of claim 1, wherein the computational circuit is part of a processing engine array having processing elements arranged in rows and columns, and wherein the filter circuit is part of a set of filter circuits that includes a corresponding filter circuit for each row of the processing engine array.

18. The integrated circuit device of claim 1, wherein the computational circuit is part of a compute engine having a plurality of compute channels, and wherein the filter circuit is part of a set of filter circuits that includes a corresponding filter circuit for each compute channel of the compute engine.

19. The integrated circuit device of claim 1, wherein the filter circuit is configured to output a zero value when the input value is a denormal number.

20. The integrated circuit device of claim 1, wherein the filter circuit is an input filter circuit, and wherein the computational circuit is coupled between the input filter circuit and an output filter circuit that receives an output of the computational circuit.

21. The integrated circuit device of claim 20, wherein the configurable bit mask of the input filter circuit and a configurable bit mask of the output filter circuit are independently configurable.

22. The integrated circuit device of claim 20, wherein the input filter circuit and the output filter circuit have a common bit mask that is applied to both the input filter circuit and the output filter circuit.

23. The integrated circuit device of claim 1, wherein the computational circuit is part of a compute engine of a plurality of compute engines in the integrated circuit device in which each compute engine is configured to perform a different type of computation than other compute engines, and wherein each compute engine in the plurality of compute engines has a corresponding set of filter circuits.

24. The integrated circuit device of claim 23, wherein the corresponding set of filter circuits for each compute engine is capable of being independently enabled and disabled from the other compute engines.

* * * * *